(12) United States Patent
Linkert et al.

(10) Patent No.: US 7,317,907 B2
(45) Date of Patent: Jan. 8, 2008

(54) SYNCHRONIZING SERVER AND DEVICE DATA USING DEVICE DATA SCHEMA

(75) Inventors: Barry Warren Linkert, Petersburg (CA); Jie Zhu, Kitchener (CA); Salim Hayder Omar, Waterloo (CA)

(73) Assignee: Research In Motion Limited, Waterloo, On ( * ) Notice: Subject to any disclaimer, the term of this patent is extended or adjusted under 35 U.S.C. 154(b) by 324 days.

(21) Appl. No.: 11/045,071

(22) Filed: Jan. 31, 2005

(65) Prior Publication Data

US 2006/0172724 A1 Aug. 3, 2006

(51) Int. Cl.
*H04Q 7/22* (2006.01)
(52) U.S. Cl. .................. 455/412.1; 455/13.2; 455/502; 370/350
(58) Field of Classification Search ............. 455/412.1, 455/13.2, 502; 370/350
See application file for complete search history.

(56) References Cited

U.S. PATENT DOCUMENTS

| | | | |
|---|---|---|---|
| 6,272,545 B1 | 8/2001 | Flanagin et al. | |
| 6,968,209 B1* | 11/2005 | Ahlgren et al. ............. | 455/558 |
| 2004/0025072 A1 | 2/2004 | Mau | |
| 2004/0224672 A1 | 11/2004 | Linkert et al. | |

FOREIGN PATENT DOCUMENTS

| WO | WO 01/69435 | 9/2001 |
|---|---|---|
| WO | WO 02/054236 | 7/2002 |

OTHER PUBLICATIONS

Seshadri P. et al: "SQLServer for Windows CE—a database engine for mobile and embedded platforms", Data Engineering, 2000. Proceedings. 16th International Conference on San Diego, CA, USA Feb. 29-Mar. 3, 2000, Los Alamitos, CA, USA, IEEE Comput. Soc. US. Feb. 29, 2000, pp. 642-644, XP010378761, ISBN: 0-7695-0506-6.

European Search Report of European Patent Application No. 05100635.1, mailed Jul. 12, 2005.

* cited by examiner

*Primary Examiner*—Joseph Feild
*Assistant Examiner*—S. Smith
(74) *Attorney, Agent, or Firm*—Matthew M. Roy; Ogilvy Renault LLP

(57) ABSTRACT

Methods and apparatus for the synchronization of first data stored to a wireless mobile device and second data stored to a remote device are provided. Schema describing the data is maintained by the device. The schema is provided by the device to assist with the synchronization. Changes to device data schema may be transparently handled by a synchronization server. In one embodiment, a method for synchronizing first data stored to a mobile device and second data stored to a remote storage device comprises receiving a schema from the mobile device describing the first data; matching respective instances of the first and second data using the schema; determining differences between the first and second data in response to the matching; and updating at least a one of the first and second data in response to the differences.

46 Claims, 5 Drawing Sheets

```
                                                                    ← 400

USE DataSource     -> Point out DataSource, ie: Exchange or Notes...
USE Database 1     -> Point out Database, ie: AddressBook, Memos...
 SyncInitialization -> Start of SyncInit command
   Database Priority -> Parameter of SyncInit command
   Group Hash List  -> Group Hash section              ← 412
     GroupID & Hash -> Data representing Database record content
     ............
   Database Config  -> Start of DB Config section      ← 402
     Conflict Resolution    -> DeviceWins or ServerWins   ← 404
     Database Record Type ID -> Unique ID per Database
       Database Table 1 Object -> Start of Table 1 Object
         Table ID           -> Unique ID per Table     ← 406
         Table Default Attribute-> Set if it is the default in DB  ← 408
         Table Schema       -> Start of schema
           FieldID 1 & Attribute -> Attribute : Key or None Key ⎫
           FieldID 2 & Attribute -> Attribute : Key or None Key ⎬ 410
           .............                                        ⎪
           FieldID N & Attribute -> Attribute : Key or None Key ⎭
       Database Table 2 Object -> Table 2 Object
       .............
       .............
       Database Table N Object -> Table N Object
   .............
   .............
USE Database 2    -> Start of Database 2
   .............
USE Database N    -> Start of Database N
```

FIG. 4

SYNCHRONIZING SERVER AND DEVICE DATA USING DEVICE DATA SCHEMA

FIELD OF THE INVENTION

The present invention relates to databases and more particularly to synchronizing data stored on a device (e.g. a handheld wireless device) and data stored on a server using a device data schema.

BACKGROUND OF THE INVENTION

Wireless communication devices including cellular telephones, personal digital assistants (PDAs) and the like often store data on the wireless devices for applications provided by the device. The data may assist users with operation of the wireless devices or provide portable information. Such data may include an address book, appointment calendar, task list, memos and a dictionary to assist with text entry using the device, among other data. Often this data is also stored remotely from the wireless device such as on an enterprise server, a personal computer or other remote storage device. For example, address book and calendar data may be shared between applications on the mobile wireless device and similar applications provided in an enterprise context. Data is typically stored in a database comprising tables. A table (e.g. for an address book) may store a plurality of records (e.g. where a record defines a contact with address and communication particulars) having one or more fields for storing data (e.g. First name, Middle name, Surname, Title, Company, Address, Business Telephone Number, Fax, Home Number, Email address, etc.).

Data may change in a variety of ways. A new record may be added or an existing record deleted. Data within one or more fields may be changed. Occasionally, a new field may be added or an existing field deleted. Fields in a record may be used to define a key useful for identifying the record within the database table. Changes to the key may also be desired.

Often changes to the data on one or more of the wireless device and the remote storage device need to be synchronized to reflect the desired state of the data on all of the devices. Synchronization of the data may occur by communicating changes made to the data between the wireless device and remote storage device and resolving any conflicts. Synchronization may be performed wirelessly (i.e. over the air) or in a wired manner if the wireless device may be coupled to the remote storage device using a serial or other wire-based connection. Synchronization is typically performed in accordance with a protocol for establishing communications between the wireless and remote storage devices and for communicating the changes. Defining a protocol which is flexible and permits a wireless device to make changes to record fields and keys is desirable.

SUMMARY OF THE INVENTION

Methods and apparatus for the synchronization of first data stored to a wireless device and second data stored to a remote device are described herein. Schema describing the data to be synchronized is maintained by the device. The schema is provided by the device to assist with the synchronization. Changes to device data schema may be transparently handled by a synchronization server. In one embodiment, a method for synchronizing first data stored to a mobile device and second data stored to a remote storage device comprises receiving a schema from the mobile device describing the first data; matching respective instances of the first and second data using the schema; determining differences between the first and second data in response to the matching; and updating at least a one of the first and second data in response to the differences.

These and other aspects including one or more computer program product aspects will be apparent to those of ordinary skill in the art.

BRIEF DESCRIPTION OF THE DRAWINGS

In order that the invention may be readily understood, embodiments of the invention are illustrated by way of examples in the accompanying drawings, in which:

FIG. 4 is a pseudo code-like description of an initialization session including schema data from a mobile device in an over the air communication directed to a Sync Server of FIG. 1.

Throughout the appended drawings, like features are identified by like reference numerals.

DETAILED DESCRIPTION

Figure 1:
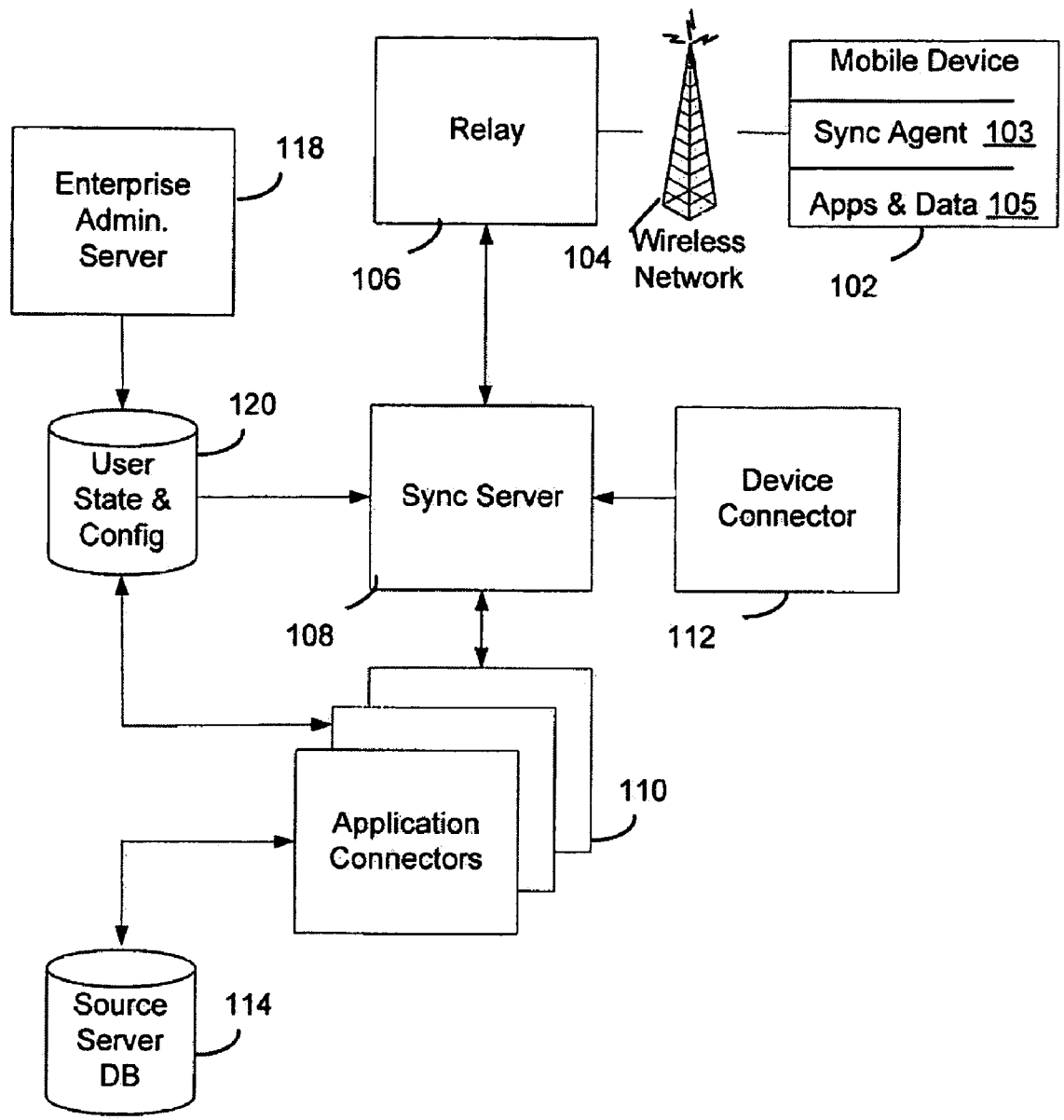
FIG. 1 is a block diagram which illustrates pertinent components of a wireless communication network configured to facilitate synchronization of data between a mobile wireless device and a remote storage device comprising an enterprise server in accordance with an embodiment of the invention.
Figure 2:
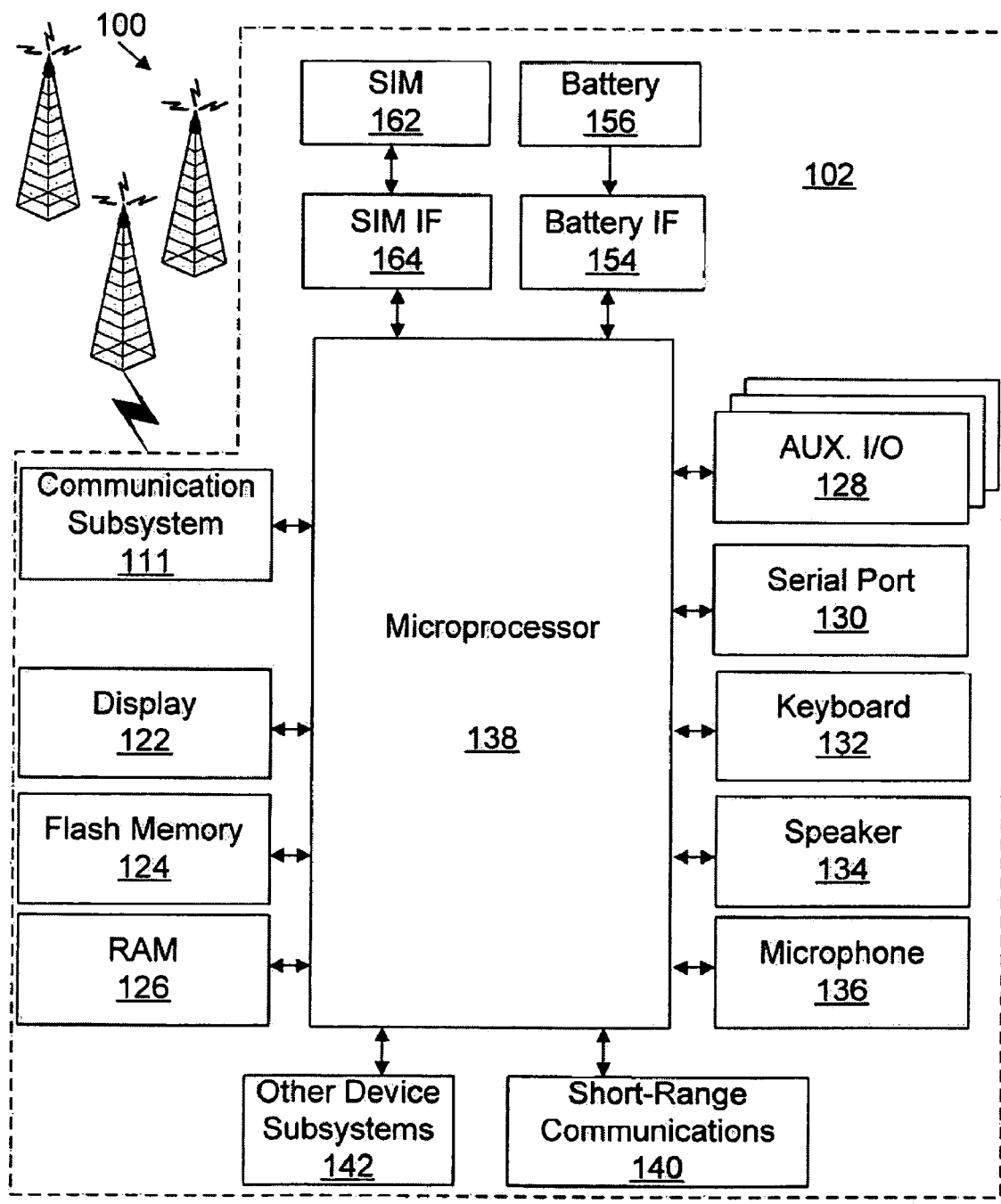
FIG. 2 is a block diagram of a preferred wireless communication device adapted for implementing an embodiment of the invention.

FIG. 1 is a block diagram of a communication system 100 which includes a mobile device 102 which communicates through a wireless communication network 104. FIG. 2 is a schematic diagram of a preferred mobile device 102 adapted in accordance with an embodiment of the invention. Mobile device 102 preferably includes a visual display 122, a keyboard 132, and optionally one or more auxiliary input/output (I/O) interfaces 128, each of which is coupled to a controller. The controller is also coupled to radio frequency (RF) transceiver circuitry e.g. communication subsystem 111 including an antenna (not shown).

Typically, the controller is embodied as a central processing unit (CPU) or microprocessor 138 which runs operating system and application software stored to the station 102 in a memory component such as flash memory 124, other ROM (not shown) and RAM 126. The controller will normally control overall operation of mobile device 102, whereas signal processing operations associated with communication functions are typically performed in the RF transceiver circuitry 111. The controller interfaces with the display 122 to display received information, stored information, user inputs, and the like. The keyboard 132, which may be a telephone type keypad or full alphanumeric keyboard, is normally provided for entering data for storage in mobile device, information for transmission to network 104, a telephone number to place a telephone call, commands to be executed on mobile device 102, and possibly other or different user inputs. Aux. I/O 128 may include a wheel or other device for navigating and selecting options in a graphical user interface (GUI) provided by the software.

Microprocessor 138 also interacts with additional device subsystems such as a display 122, a flash memory 124 or other persistent store, a random access memory (RAM) 126, auxiliary input/output (I/O) subsystems 128, a serial port 130, a keyboard 132, a speaker 134, a microphone 136, a short-range communications subsystem 140, and any other device subsystems generally designated at 142. Some of the subsystems shown in FIG. 2 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list. Operating system software used by microprocessor 138 is preferably stored in a persistent store such as flash memory 124, which may alternatively be a read-only memory (ROM) or similar storage element (not shown). Those skilled in the art will appreciate that the operating system, specific device applications, or parts thereof, may be temporarily loaded into a volatile store such as RAM 126.

Microprocessor 138, in addition to its operating system functions, preferably enables execution of software applications on device 102. A predetermined set of applications which control basic device operations, including at least data and voice communication applications, will normally be installed on device 102 during its manufacture. A preferred application that may be loaded onto device 102 may be a personal information manager (PIM) application having the ability to organize and manage data items relating to the user such as, but not limited to, instant messaging (IM), e-mail, calendar events, voice mails, appointments, and task items. Naturally, one or more memory stores are available on device 102 and SIM 162 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile device user's corresponding data items stored and/or associated with a host computer system thereby creating a mirrored host computer on device 102 with respect to such items. This is especially advantageous where the host computer system is the mobile device user's office computer system. Additional applications may also be loaded onto device 102 through network 100, an auxiliary I/O subsystem 128, serial port 130, short-range communications subsystem 140, or any other suitable subsystem 142, and installed by a user in RAM 126 or preferably a non-volatile store (not shown) for execution by microprocessor 138. Such flexibility in application installation increases the functionality of device 102 and may provide enhanced on-device functions, communication-related functions, or both. For example, secure communication applications may enable electronic commerce functions and other such financial transactions to be performed using device 102.

In a data communication mode, a received signal such as a text message, an e-mail message, or web page download will be processed by communication subsystem 111 and input to microprocessor 138. Microprocessor 138 will preferably further process the signal for output to display 122 and/or to auxiliary I/O device 128. A user of device 102 may also compose data items, such as e-mail messages, for example, using keyboard 132 in conjunction with display 122 and possibly auxiliary I/O device 128. These composed items may be transmitted over a communication network through communication subsystem 111 or short range communication subsystem 140.

For voice communications, the overall operation of device 102 is substantially similar, except that the received signals would be output to speaker 134 and signals for transmission would be generated by microphone 136. Alternative voice or audio I/O subsystems, such as a voice message recording subsystem, may also be implemented on device 102. Although voice or audio signal output is preferably accomplished primarily through speaker 134, display 122 may also be used to provide an indication of the identity of a calling party, duration of a voice call, or other voice call related information, as some examples.

Serial port 130 is normally implemented in a personal digital assistant (PDA) type communication device for which synchronization with a user's desktop computer is a desirable, albeit optional, component. Serial port 130 enables a user to set preferences through an external device or software application and extends the capabilities of device 102 by providing for information or software downloads to device 102 other than through a wireless communication network. The alternate download path may, for example, be used to load an encryption key onto device 102 through a direct and thus reliable and trusted connection to thereby provide secure device communication.

Short-range communications subsystem 140 of FIG. 1 is an additional optional component which provides for communication between device 102 and different systems or devices, which need not necessarily be similar devices. For example, subsystem 140 may include an infrared device and associated circuits and components, or a Bluetooth™ communication module to provide for communication with similarly-enabled systems and devices. Bluetooth™ is a registered trademark of Bluetooth SIG, Inc.

Mobile device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile device 102 may be a multiple-module unit comprising a plurality of separate components, including but in no way limited to a computer or other device connected to a wireless modem. In particular, for example, in the mobile device block diagram of FIG. 1, RF transceiver circuitry and antenna may be implemented as a radio modem unit that may be inserted into a port on a laptop computer. In this case, the laptop computer would include a display, keyboard, and one or more auxiliary UIs, and controller may remain within the radio modem unit that communicates with the computer's CPU or be embodied as the computer's CPU. It is also contemplated that a computer or other equipment not normally capable of wireless communication may be adapted to connect to and effectively assume control of RF transceiver circuitry and antenna of a single-unit device such as one of those described above.

Mobile device 102 communicates in and through wireless communication network 104 and Relay 106 to a Sync Server 108. Persons of ordinary skill in the art will understand that many wireless carrier protocols to support communications may be used including GSM, GPRS, etc. Network access is associated with a subscriber or user of device 102 and therefore device 102 requires a Subscriber Identity Module or "SIM" card 162 to be inserted in a SIM IF 164 in order to operate in the network. Device 102 is a battery-powered device so it also includes a battery IF 154 for receiving one or more rechargeable batteries 156. Such a battery 156 provides electrical power to most if not all electrical circuitry in device 102, and battery IF 154 provides for a mechanical and electrical connection for it. The battery IF 154 is coupled to a regulator (not shown) which provides power V+ to all of the circuitry.

The wireless link shown in communication system 100 of FIG. 1 represents one or more different channels typically different radio frequency (RF) channels, and associated protocols used between wireless network 104 and mobile device 102. An RF channel is a limited resource that must be conserved, typically due to limits in overall bandwidth and a limited battery power of mobile device 102. Those skilled in art will appreciate that a wireless network in actual practice may include hundreds of cells depending upon desired overall expanse of network coverage. All pertinent components may be connected by multiple switches and routers (not shown), controlled by multiple network controllers.

Mobile device 102 includes application software and data therefore 105 such as an address book, task list and memos etc. Data 105 may be synchronized with application data maintained in an enterprise context, providing, for example, email, calendar and other services in an enterprise network to the mobile device 102. Sync Agent 103 provides an interface between applications 105 on the device and Sync Server 108 coordinating synchronization of data 105 with Sync Server 108. Sync Agent 103 receives notifications of record changes from those applications 105, converts the data to a format for communicating to the Sync Server 108 and formulates a sync requests to the Sync Server. In the opposite direction, the Sync Agent processes commands from the Sync Server and applies any changes to the application data stored on the device.

Relay 106 provides a bridge between the wireless network 104 and a data network, such as the Internet, coupling Sync Server 108 to the wireless network. Relay 106 provides a variety of services including protocol conversion and routing.

Sync Server 108 provides an interface between application connectors 110 and Sync Agent 103. For example, Sync Server 108 accepts sync requests from the application connectors 110, filters any change data and converts the filtered data to format for sending to the device 102. This formatted data along with associated header information is communicated to the Sync Agent 103 in accordance with definitions provided by device connector 112. Similar operations are performed for communications in the opposite direction for sync requests received from the device 102.

Device Connector 112 contains specific information about a mobile device 102. A main responsibility of device connector 112 is to convert records, typically in XML, to a format that device 102 understands and vice versa. Device connector 112 is designed to support different versions of device software as well as other device types, based on an XML document.

Enterprise Administration Server 118 provides an interface to create and maintain User Configuration information 120 stored to a database accessible to Sync Server 108. Enterprise Administration Server 118 provides UI configuration for setting field mapping, enabling/disabling of sync databases and other related sync configurations. This information 120 is periodically polled by Sync Server 108 for any changes and for sending to the Sync Agent and/or associated connectors.

Application Connectors 110 respectively interface between a back-end source server 114 such as Microsoft Exchange® for Lotus Notes®, to the Sync Server. When record changes occur within the server's database 114, the associated application connector 110 detects the record changes, formulates a sync request and sends this request to the Sync Server. Application connectors 110 may provide an XML document that contains database schema/mapping information for a particular database on the device 102. Sync Server 108 processes this XML document to transform any data from the Application Connector 110 to the device. As described further below in accordance with an embodiment of the present invention, device 102 may provide such schema to Sync Server 108 such as upon initialization of a slow synchronization process.

Figure 3:
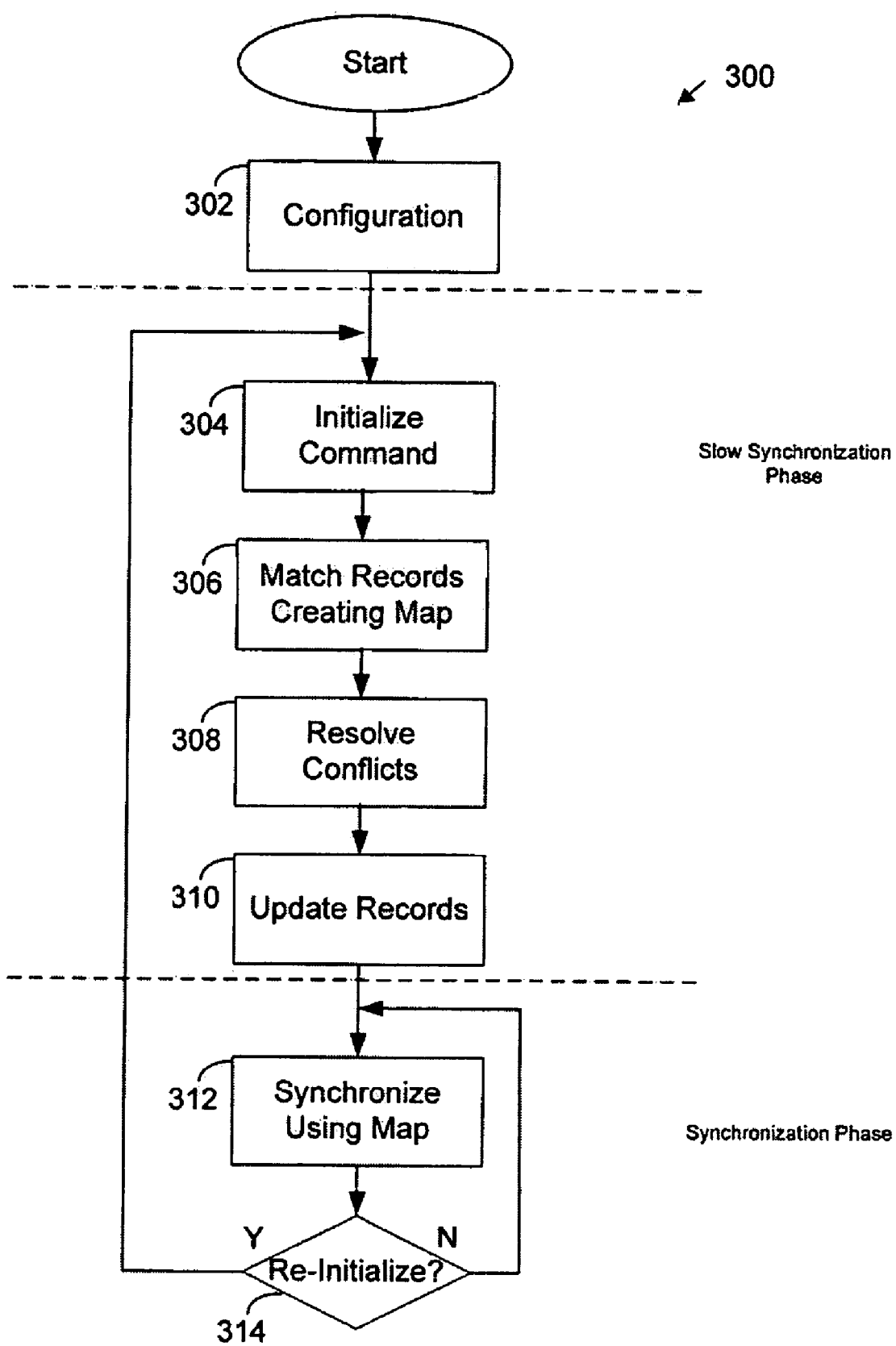
FIG. 3 is a flow chart of operations for over the air synchronization in accordance with the invention.

FIG. 3 is a flow cart of operations 300 for synchronizing data on a wireless device such as station 102 and a second remote storage device such as source server database 114 in accordance with an embodiment of the invention. At step 302, sync configuration of device 102 is undertaken. Upon detection of services with synchronization needs, Sync Agent 103 checks whether sync configuration information is present on device 102. If this configuration information is not present, Sync Agent 103 sends a 'Get' configuration command to Sync Server 108. Sync Server 108 responds by sending configuration information to the device 102. This configuration information identifies the available data sources (i.e. "Exchange" connector 110), databases (e.g. "Address Book") to synchronize with (i.e. 114), user sync settings (from 120) and a series of initial field mapping tags as available. The series of field tags allows the synchronization operations to perform field deltas (i.e. comparisons at the field level to determine differences in data) to minimize over the air traffic during eventual synchronization.

In accordance with the present embodiment of the invention, synchronization is divided into two phases: the slow sync phase and the synchronization phase. The slow sync phase is initiated before synchronization occurs. Following configuration, at step 304, Sync Agent 103 initializes the slow sync operations for each of the enabled databases in a sequential manner. The initiating Sync Agent 103 sends an 'Initialize' command to the Sync Server 108 to initiate the slow sync process indicating the database to be used. This slow sync process attempts to merge similar records between the Source Server 114 and the device 102, resolving record conflicts if they exist. Records existing on only one side are reflected on the corresponding side. During this slow sync process, records are not deleted. Rather the result of this slow sync process creates a mapping history so the Sync Server 108 can uniquely identify records between the server and the device. By using a mapping history, any updates, additions or deletions of records from one side will cause the corresponding record on the other side to be updated during the eventual synchronization phase.

In addition, any user configuration change by Enterprise Admin Server 118 and its store 120 may be detected by the Sync Server 108 and reflected to the device 102 and connectors 110.

As mentioned above, the slow sync process attempts to merge similar records between the server 114 and device 102. In order to compare records stored in different data stores (e.g. on device 102 and another on source server database 114) the schema for the database is required. Database schema may be described in a variety of ways such as Extensible Markup Language (XML) documents and other coding. Server 108 may obtain the schema in different ways. For example, in accordance with the present embodiment of the invention, device 102 may provide the schema during the initialization phase according to the synchronization protocol. Alternatively, the applicable application connectors 110 may provide the schema for the corresponding database to give server 108 the requisite knowledge to do the record-based matching. In cases where schema is available from more than one location, a mechanism to determine which schema to use may be required. A configuration setting and/or administered security policy may be useful to govern such a decision.

To reduce the number of records fetched from the device 102 or sent to the device 102 during the slow sync phase, a record-grouping approach is used in which a group of records is represented by a hash value of a content of the records. The hash value of a group represents an over all hash of the records in the group. During the slow sync process, server 108 matches (or not) the group data sent from device 102 with the corresponding group data generated using the schema at server 108 to determine which of the devices records (i.e. from data 105) need not be fetched to server 108, which of server 114 records need to be sent to device 102 and which of the records between the two are conflicted and need to be resolved.

In accordance with an embodiment of the invention, every group is given an ID. The group ID ranges from 0 to Number of Groups-1. Each record within a table has a unique RecordID within its database. Individual records are assigned to a group in response to the record's RecordID, for example, as follows:

Group ID=RecordID MOD (Number of Groups)

Therefore if a RecordID is known, then the Group the record belongs to is known as well. Persons of ordinary skill in the art will appreciate that using the modulo operation (MOD) does not guarantee a good balance in terms of the number of records per group but is easy to compute.

Generating a group data value from the records of a group may be determined in a variety of ways. However, to make the determination of the group data value a relatively easy process, the following assumptions are considered:

Record order does not matter within the group. Thus no record sorting is required to calculate the group data value and no matter how records arranged within the group, the group data value should be the same with every arrangement; and The record (or instance) data value for each individual record is based on the hash of the record fields. And no matter how record fields get arranged, the record data value should be the same as is made possible since all the record fields tags are unique by definition.

Thus regardless of how a record's fields appear in a record and the records appear in the group, the group data value is the same. In the present embodiment, a hash function defined on the record fields is "exclusive or" (XOR) for generating the record data. And the hash function defined on the records to determine the group data value from the record hash values is XOR as well.

The technique employs hashes to identify similar record information. Two hashes are used to describe the record. 'Key Field' hash and a 'Record' hash. The 'Key Field' hash, set by the device's schema is a numeric value to describe certain fields within a record while 'Record' hash is a value describing all the mapped fields within a record. As an example, suppose a contact mapping is configured on the device 102 where, 'First Name', 'Last Name' and 'Company' fields makeup the 'Key' hash while the 'Record' hash contains of all the mapped fields within the record fro contact (e.g. Address fields, email, web page, various phone numbers, etc.).

As noted, in the present embodiment, database schema is provided by Sync Agent 103 in the initialization command (step 304), if possible, to start the slow sync phase. The schema indicates to Sync Server 108 the device's current database structure. A database can have multiple tables, and each table is associated with its table ID and schema, which describes the record format with field ID, field type (key or non-key). FIG. 4 is a pseudo code-like description 400 of an initialization session 402 from device 102 in an over the air communication directed to Sync Server 108 including schema data. For each database to be synchronized (i.e. Database 1, Database 2 . . . Database N), database configuration schema information (e.g. 402 for Database 1) is provided. Database configuration information 402 includes a unique ID 404 for the database and, for each table (object) thereof, a unique Table ID 406 for the table, a table default indicator 408 and table schema 410 comprising one or more FieldID and Key attribute indicator pairs.

Communications between device 102 and server 108 are typically encoded in a bandwidth saving manner such as a Tag Length Encoding (TLE) format. Device connector 112 may assist with appropriate data conversion or transformations as previously described.

When device 102 sends an Initialize command to server 108 including group hash values and optional database schema (step 304), the server side, in response, starts the slow sync phase comparison process to match records creating a mapping for future synchronization (Step 306). Server 108 first starts with a comparison of group hashes to match records.

If device 102 does not send the database schema, server utilizes an XML mapping for the corresponding database available from an applicable application connector 110 to calculate group hash values. However, if device 102 does send the database schema e.g. 402, server 108 calculates record key hashes and record hashes based on the received schema from device 102 and then the group hash values for all of the records of the applicable corresponding source server database 114.

Server 108 then compares respective generated group hashes and received group hashes from device 102. Server 108 matches respective groups and group hash values based on the Group ID. If two respective hashes match then server 108 considers that the corresponding records from that group match. Persons of ordinary skill in the art will appreciate that an XOR operation to generate a hash will not guarantee unique hash values for every set of records. There is a chance though generally remote, that two groups are considered to match when in fact both do not have identical records. An additional check to reduce false positive matches may include a comparison of the count of records in the compared groups. As such, device 102 may send a record count with the group hash value (not shown). Alternative hash values may be generated or a second hash value using a different function may be generated and compared.

If two respective group hash values do not match, then there are bone or more differences among the records of each respective group. In response, server 108 queries device 102 to provide keys and field hashes for each record in a groups that does not match. Records may be matched based on the Key Hashes of the records. The Record Field Hash may be used to determine whether a particular record conflicts with another record provided the two records match and share the same unique ID and share the same key hash value.

In response to the matching process, server 108 determines which records may be:

Added to device 102 if the records exist only on server 108;

Updated on device 102 if they exist on both server 108 and device 102 sides but the conflict is resolved in favor of the server 108 (i.e. server records win) over the device records; and Fetched if either the records exist only on device 102 or exist on both device 102 and server 108 but the conflict is resolved in favor of the device 102 such that device records win over server records.

This slow sync process creates a history file, mapping records between the server and that contained on the device. At this point, the records are considered synchronized.

Figure 5:
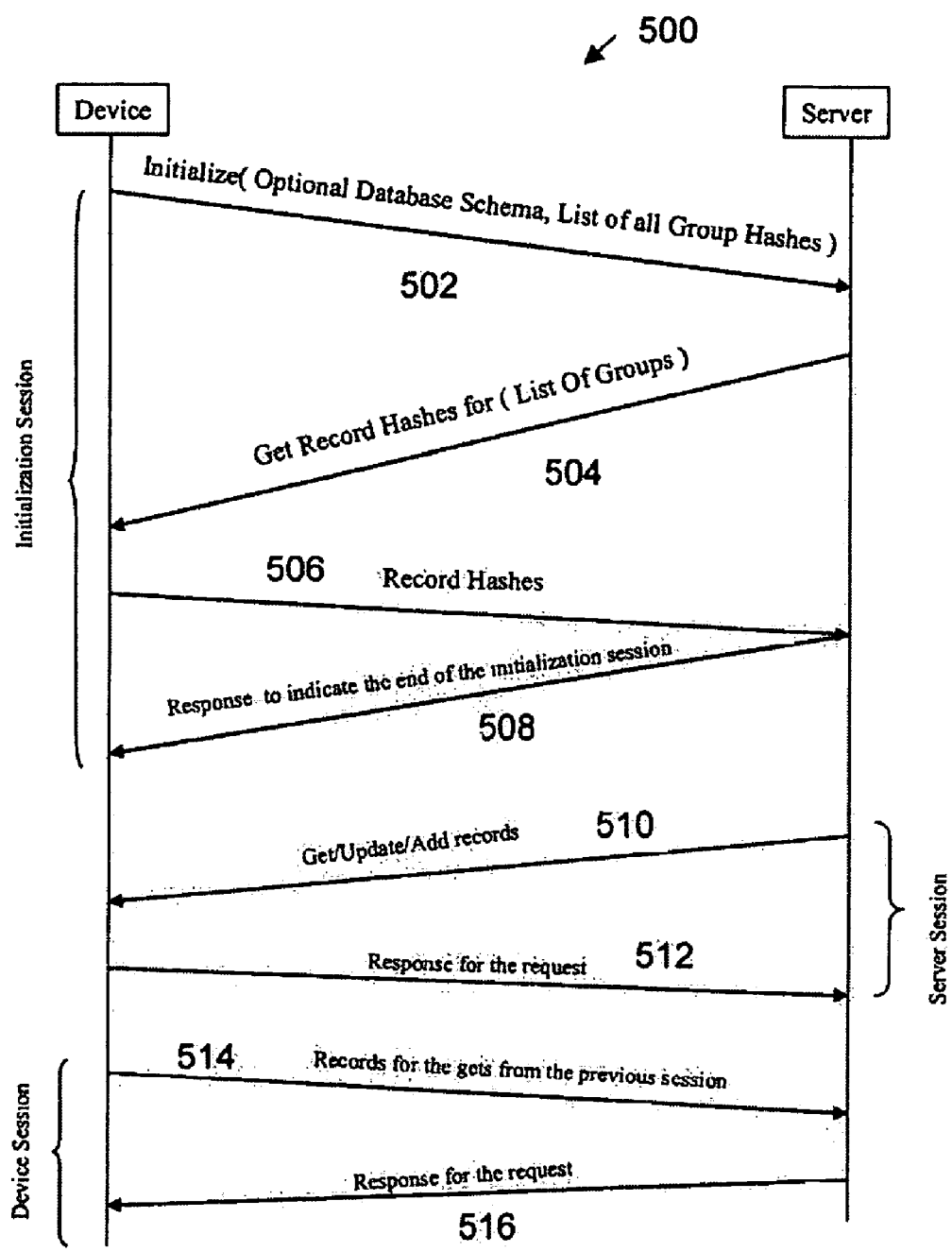
FIG. 5 is a representation of an example of message traffic between a wireless device and a server for synchronizing data in accordance with the operations of the flow chart of FIG. 3.

FIG. 5 illustrates a messaging exchange 500 between device 102 and sync server 108 illustrating the slow sync initialization phase as well as server session and device session for merging mapped records completing the slow sync phase. At 502, Device 102 sends an initialize message with optional database schema and group hashes. In response to a determination of which group hashes received match the group hashes determined by server 108 using the database schema, at 504, server 108 sends a get record hash request for a particular list of groups that have no match.

At 506, device 102 sends thee record hashes. Initialization is completed with a response from server 108 (508). At 510, the server having completed the mapping and determined which new records to send to the device, which records to request from the device and which changes to make to device records, appropriate commands are sent to the device and a response received (512). At 514, device 102 sends the appropriate records and receives a response (516) completing the initialization and record updating.

With reference again to FIG. 3, after the databases are initialized, future changes may be synchronized using the map, sending the changes in the form of commands, for example, over the air in a session-oriented protocol (step 312). Preferably over the air transmissions are minimized and field level changes sent with appropriate commands to amend a respective record to reflect a new field change. Either party (server 108 or device 102) may initiate such changes and may send sync requests immediately (in a progressive mode) in response to changes or collect the changes and send them to the other sync party in a batch mode. Individual databases may be configured for progressive or batch mode.

Slow Sync initialization for a database may be commenced when:
the database is OTA enabled but not initialized;
the database is OTA disabled and becomes OTA enabled;
the database Sync Type has changed;
the database schema gets changed;
new schema is added to the database; and
the sync server 108 forces initialization by sending an initialize command.

Re-initialization for one or another of the above-noted reasons is illustrated as step 314. Persons of ordinary skill in the art will appreciate that such step may occur at other points in the illustrated operations as these events may occur asynchronously. Though not shown explicitly, device 102 may be operated to add a database or change the schema of an existing database. Such events may initiate slow sync phase operations (Step 304-310) and any necessary configuration requirements (step 302).

Advantageously, over the air (OTA) synchronization as described may effectively synchronize various databases including contacts, tasks and memos using different sources such as Lotus Notes or Microsoft Exchange. Additional application data such as 'Email Settings' and 'Email Filters' may also be synchronized. The OTA protocol is able to synchronize a variety of database configurations. Sync Server 108 preferably employs field level deltas for each record in order to minimize over the air traffic. Further optimized record handling aggregates multiple changes of an individual record such that multiple changes within a batch are merged or filtered to remove redundant changes where applicable. The OTA protocol supports simultaneous synchronization of multiple databases within a given sync request or session. The protocol supports batch or progressive sync configurable on individual databases to synchronize records following a slow sync initialization. Each database can be configured to support: 2-Way Sync, 1-Way Sync to Server and 1-Way Sync to Devices Sync Agent 103 on the device can support multiple services. Device connector 112 can support multiple devices and software versions, using an XML field-mapping document. The protocol and operations can support $3^{rd}$ party developers.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

We claim:

1. A method performed by a server for synchronizing first data stored to a mobile device and second data stored to a remote storage device, the method comprising steps of:
receiving a schema that comprises group-matching date representative of groups of instances of the first data;
generating corresponding group-matching data for groups of instances of the second data using the schema;
determining group-level differences between respective group-matching data for the first and second data;
matching respective instances of the first and second data in response to the group-level differences; and
updating at least one of the first and second data in response to the differences, wherein the group-matching data for the first data and group-matching data for the second data comprise respective hash data of corresponding groups of the first data and the second data as well as record counts comprising a number of records for each group of instances of the first and second data, respectively.

2. The method of claim 1 comprising maintaining the synchronization of the first and second data in response to the matching.

3. The method of claim 2 wherein maintaining comprises: determining changes to the second data and transmitting at least some of the changes to update the first data in accordance with an over the air session-oriented protocol; and receiving changes to the first data in accordance with an over the air session-oriented protocol and updating the second data in response.

4. The method of claim 3 wherein said transmitting is responsive to a progressive mode and a batch mode.

5. The method of claim 2 wherein said receiving, matching, determining and updating define a slow synchronization phase and said maintaining comprises a synchronization phase.

6. The method of claim 5 comprising performing said slow synchronization phase in response to a change in the schema.

7. The method of claim 1 comprising requesting instance matching data for the first data in response to the group-level differences; generating corresponding instance matching data for the second data using the schema; determining instance-level differences between respective instance matching data for the first data and the second data and wherein matching the respective instances of the first and second data is in response to the instance-level differences.

8. The method of claim 7 wherein the instance matching data for the first data and instance matching data for the second data comprises respective hash data of instances of the first data and second data from corresponding groups of the first data and second data.

9. The method of claim 1 wherein the first and second data are stored to corresponding tables of respective databases, said schema defining a database schema for said respective databases and said respective instances of the first and second data comprising records of said respective databases.

10. The method of claim 1 wherein updating comprises communicating at least some of the differences to update the first data in accordance with an over the air session-oriented protocol.

11. The method of claim 1 wherein updating comprises receiving at least some of the differences to update the second data in accordance with an over the air session-oriented protocol.

12. The method of claim 1 wherein the steps of receiving an updating are performed using a wireless network coupling the server and mobile device for communications.

13. A method performed by a mobile device for synchronizing first data stored to the mobile device and second data stored to a remote storage device, the method comprising steps of:
  storing at the mobile device a schema that comprises group-matching data representative of groups of instances of the first data;
  communicating the schema to a server adapted to generate corresponding group-matching data for groups of instances of the second data using the schema and to match respective instances of the first and second data using the schema by determining group-level differences between respective group-matching data for the first and second data; and
  updating at least one of the first and second data in response to the differences determined by the server, wherein the group-matching data for the first data and group-matching data for the second data comprise respective hash data of corresponding groups of the first data and the second data as well as record counts comprising a number of records for each group of instances of the first and second data respectively.

14. The method of claim 13 comprising maintaining the synchronization of the first and second data in response to the matching.

15. The method of claim 14 wherein maintaining comprises: determining changes to the first data and transmitting at least some of the changes to update the second data in accordance with an over the air session-oriented protocol; and receiving changes to the second data in accordance with an over the air session-oriented protocol and updating the first data in response.

16. The method of claim 15 wherein said transmitting is responsive to a progressive mode and a batch mode.

17. The method of claim 14 wherein said defining, communicating and updating define a slow synchronization phase and said maintaining comprises a synchronization phase.

18. The method of claim 17 comprising initiating said slow synchronization phase on response to a change in the schema.

19. The method of claim 13 comprising providing instance matching data for the first data in response to a request from the server for generating corresponding instance matching data for the second data using the schema; determining instance-level differences between respective instance matching data for the first data and the second data and matching the respective instances of the first and second data in response to the instance-level differences.

20. The method of claim 19 wherein the instance matching data for the first data and instance matching data for the second data comprises respective hash data of instances of the first data and second data from corresponding groups of the first data and second data.

21. The method of claim 13 wherein the first and second data are stored to corresponding tables of respective databases, said schema defining a database schema for said respective databases and said respective instances of the first and second data comprising records of said respective databases.

22. The method of claim 13 wherein updating comprises receiving from the server at least some of the differences to update the first data in accordance with an over the air session-oriented protocol.

23. The method of claim 13 wherein updating comprises transmitting to the server at least some of the differences to update the second data in accordance with an over the air session-oriented protocol.

24. The method of claim 13 wherein the steps of communicating and updating are performed using a wireless network coupling the server and mobile device for communications.

25. A server for synchronizing first data stored to a mobile device and second data stored to a remote storage device, the server comprising:
  a communications system for transmitting to and receiving messages from the mobile device;
  a processor coupled to the communication system for processing received messages and messages for transmitting; and
  a memory coupled to the processor for storing instructions to configure the processor to: receive a schema from the mobile device, the schema comprising group-matching data representative of groups of instances of the first data; generate corresponding group-matching data for groups of instances of the second data using the schema; match respective instances of the first and second data in response to group-level differences between respective group-matching data for the first and second data; and update at least one of the first and second data in response to the differences, wherein the group-matching data for the first data and group-matching data for the second data comprise respective hash data of corresponding groups of the first data and the second data as well as record counts comprising a number of records for each group of instances of the first and second data, respectively.

26. The server of claim 25 wherein the instructions configure the processor to maintain the synchronization of the first and second data in response to the match of respective instances.

27. The server of claim 26 wherein the first and second data are stored to corresponding tables of respective databases, said schema defining a database schema for said respective databases and said respective instances of the first and second data comprising records of said respective databases.

28. The method of claim 26 wherein the instructions to configure the processor to maintain comprise instructions to configure the processor to determine changes to the second data and transmit at least some of the changes to update the first data in accordance with an over the air session-oriented protocol; and receive changes to the first data in accordance with an over the air session-oriented protocol and update the second data in response.

29. The server of claim 28 wherein said the instructions to configure the processor to transmit are responsive to a progressive mode and a batch mode.

30. The server of claim 26 wherein the instructions to configure the processor to receive, match, determine and update a slow synchronization phase capability and said instructions to configure the processor to maintain define a synchronization phase capability.

31. The server of claim 30, comprising instructions to perform said slow synchronization phase capability in response to a change in the schema.

32. The server of claim 25 wherein the instructions configure the processor to request instance matching data for the first data in response to the group-level differences; generate corresponding instance matching data for the second data using the schema; determine instance-level differences between respective instances matching data for the first data and the second data and wherein the instructions to match the respective instances of the first and second data are response to the instance-level differences.

33. The server of claim 32 wherein the instance matching data for the first data and instance matching data for the second data comprises respective hash data of instances of the first data and second data from corresponding groups of the first data and second data.

34. The server of claim 25 wherein the instructions to configure the processor to update comprise instructions to configure the processor to transmit to the mobile device at least some of the differences to update the first data in accordance with an over the air session-oriented protocol.

35. The server of claim 25 wherein the instructions to configure the processor to update comprise instructions to configure the processor to receive from the mobile device at least some of the differences to update the second data in accordance with an over the air session-oriented protocol.

36. A mobile device for synchronizing first data stored to the mobile device and second data store to a remote storage device, the mobile device comprising:
   a communications system for transmitting to and receiving messages from the mobile device;
   a processor coupled to the communication system for processing received messages and messages for transmitting; and
   a memory coupled to the processor for storing instructions to configure the processor to: define at the mobile device a schema, the schema comprising group-matching data representative of groups of instances of the first data; transmit the schema to a server adapted to match respective instances of the first and second data by using the schema to generate corresponding group-matching data for groups of instances of the second data in order to then determine group-level differences between respective group-matching data for the first and second data; and update at least one of the first and second data in response to the differences determined by the server, wherein the group-matching data for the first data and group-matching data for the second data comprise respective hash data of corresponding groups of the first data and the second data as well as record counts comprising a number of records for each group of instances of the first and second data, respectively.

37. The mobile device of claim 36 comprising instructions to configure the processor to maintain the synchronization of the first and second data in response to the match of respective instances.

38. The mobile device of claim 37 wherein the instructions to configure the processor to maintain comprising instructions to determine changes to the first data and transmit at least some of the changes to update the second data in accordance with an over the air session oriented protocol.

39. The mobile device of claim 38 wherein said instructions to transmit are responsive to a progressive mode and a batch mode.

40. The mobile device or claim 37 wherein the instructions to configure the processor to define, transmit and update define a slow synchronization phase capability and wherein the instructions to configure the processor to maintain define a synchronization phase capability.

41. The mobile device of claim 40 comprising instructions to configure the processor to initiate said slow synchronization phase in response to a change in the schema.

42. The mobile device of claim 36 comprising instructions to configure the processor to provide instance matching data for the first data in response to a request from the server to generate corresponding instance matching data for the second using the schema; determine instance-level differences between respective instance matching data for the first data and the second data and match the respective instances of the first and second data in response to the instance-level differences.

43. The mobile device of claim 42 wherein the instance matching data for the first data and instance matching data for the second data comprises respective hash data of instances of the first data and second data from corresponding groups of the first data and second data.

44. The mobile device of claim 36 wherein the first and second data are stored to corresponding tables of respective databases, said schema defining a database schema for said respective databases and said respective instances of the first and second data comprising records of said respective databases.

45. The mobile device of claim 36 wherein the instructions to configure the processor to update comprise instruction for receiving from the server at least some of the differences to update the first data in accordance with an over the air session-oriented protocol.

46. The mobile device of claim 36 wherein the instructions to configure the processor to update comprise instruction to configure the processor to transmit to the server at least some of the differences to the first data to update the second data in accordance with an over the air session-oriented protocol.

* * * * *